3,057,682
PROCESS FOR RECOVERY AS ZIRCONIUM OXY-
SULFATE ZIRCONIUM VALUES FROM SALT
BATHS
Irwin J. Groce, Reseda, Calif., assignor, by mesne assignments, to National Distillers and Chemical Corporation, a corporation of Virginia
No Drawing. Filed July 15, 1960, Ser. No. 42,992
5 Claims. (Cl. 23—114)

This invention relates to a new and improved method for the purification and recovery of zirconium values. More specifically, the invention relates to a method for recovering zirconium values from a purge obtained in a salt bath purification system for zirconium tetrahalides.

Recently there have been increased demands for purified zirconium halides free from contaminating metals which are often associated therewith. A number of methods have been disclosed for purifying crude zirconium halides, that is, zirconium halides which may be contaminated with one or more halides or other compounds of such metals as aluminum, cadmium, cobalt, chromium, iron, magnesium, manganese, molybdenum, nickel, lead, silicon, tin, titanium, tungsten, vanadium, and so forth. For example, one method which has proved satisfactory involves distillation or volatilization of purified zirconium halide from a fused mixture containing the impure zirconium halide and at least one alkali metal halide. Discussions concerning this method are found in the articles by Horrigan, "Journal of Metals" (pages 1118–1120, October 1955) and by Howell et al., "Journal of Metals" (pages 193–200, January 1957). In U.S. Patent No. 2,916,362 Horrigan and Sprague disclose a process for obtaining purified zirconium tetrachloride from a fused mixture of impure zirconium tetrachloride and at least one chloride of an alkali metal or an alkaline earth metal.

A recent improvement in this process calls for the addition of finely divided metals or metal subhalides to the salt bath to effect greater purification and to enhance the purifying capacity of the fused salt mixture. Finely divided zirconium metal, for example, has been effectively used for this purpose. It has been found, however, that in the operation of such a salt melt purification system, especially under the continuous operating conditions required in commercial practice, and with or without the addition of the finely divided metals or metal subhalides, an appreciable build-up of impurities occurs, causing sludge formation and undesirable solidification. Efforts to avoid sludge formation and solidification have not been successful. In U.S. Patent No. 2,916,362, for example, it is stated that regeneration of the salt bath mixture can be accomplished by disconnecting the system and adding fresh zirconium tetrachloride. It is obvious that the build-up of impurities in the salt mixture will continue and that ultimately the salt mixture will have to be completely discarded. The high percentage of zirconium values in the discarded salt mixture was one of the serious disadvantages of this method. Instead of discarding the salt mixture, one proposal involved an atempt to remove the insoluble impurities from the salt mixture and then to reuse the latter. However, the extensive operations required to remove the insoluble impurities without destroying the usefulness of the salt mixture rendered such a scheme impractical.

One object of this invention is to provide a more efficient method for purifying zirconium halides by the molten salt bath technique. Another object of the invention is to provide a method for improving the recovery of purified zirconium values from the molten salt bath. A further object of the invention is to provide a novel, efficient, and inexpensive method for the recovery of zirconium values from a salt melt purge. A still further object of the invention is to provide a method for the recovery from a salt melt purge of zirconium values substantially free from undesirable impurities. Other objects and advantages of the present invention will become apparent from the following description.

In accordance with the present invention, it has now been found that these objects may be accomplished by periodically withdrawing a portion or purge of the salt bath mixture during zirconium halide purification operations and subjecting the withdrawn portion or purge to a specific process to recover the zirconium values therefrom.

Depending upon the starting materials, the salt melt purge contains varying amounts, usually between about 60 and 85 percent by weight, of zirconium halides, present usually as zirconium tetrachloride and zirconium oxychloride. In addition, the purge may contain about 0 to 25 percent of water insolubles (generally comprising about 75 percent of zirconium oxide and 25 percent of carbon), about 7 to 12 percent of potassium halide, about 2 to 4 percent of sodium halide, about 0 to 4 percent of ferric and ferrous halides, and about 0 to 2 percent of aluminum halide or oxide.

It has now been discovered that these zirconium values can be recovered by a method which involves treating the purge material with water to dissolve soluble zirconium values and to maintain insoluble zirconium values and other insoluble materials such as carbon and aluminum oxide in suspension; treating the resultant slurry with sulfuric acid to provide the requisite sulfate ion for subsequent precipitation as zirconium oxysulfate; and then treating the solution with a base, such as ammonia, to precipitate the zirconium as purified oxysulfate,

$$Zr_5O_8(SO_4)_2 \cdot xH_2O$$

The recovered zirconium oxysulfate may be further treated to restore it to the zirconium tetrachloride form suitable for feed to the salt melt system. This treatment involves metathesis with additional ammonia to convert the oxysulfate precipitate to a zirconium hydroxide precipitate; the hydroxide is calcined to the oxide; and the oxide is converted to the tetrachloride by conventional chlorination processes, using carbon as the reducing compound.

More specifically, the solid purge material is crushed and then dissolved in an excess of water at about 10° to about 30° C., thus forming a slurry which is kept under agitation to maintain the insoluble material in suspension. In general, it is preferred to employ sufficient water to form a slurry containing about 0.3 to 0.7 pound of zirconium, preferably about 0.5 to 0.6 pound of zirconium, per gallon of water. The resultant slurry is treated with sufficient sulfuric acid (67 to 98 percent, and preferably about 92–93 percent, concentration) to maintain the ratio of zirconium to sulfate ion at about 2:1 to 2.8:1, and preferably at about 2.5:1, based on the soluble zirconium. This ratio of zirconium to sulfate ion is important, since it has been found that as the sulfate proportion is increased incomplete precipitation of the zirconium values results, whereas when the sulfate proportion is decreased the particle size of the precipitate is so fine that conventional separation methods such as filtration are difficult. The temperature at which the treatment with sulfuric acid takes place is generally in the range of about 10° to about 30° C., and is preferably about 15° to 25° C.

To recover the soluble zirconium values from solution, the sulfate ion-containing slurry is diluted with hot water to a soluble zirconium concentration of about 0.1 to about 0.2 pound of zirconium per gallon of water, with the preferred concentration being 0.15 pound of soluble zirconium per gallon of water. The solution is brought to a temperature of about 85° to about 95° C., and preferably about 90° C., by the addition of hot water or by steam sparging. The acidity of the slurry is then adjusted to a pH of about 1.4 to 1.6, and preferably held at 1.5, by the addition of a water-soluble base, such as ammonia, sodium hydroxide, or potassium hydroxide. The preferred base is ammonia since it leaves no residual chlorides which will be involatile upon subsequent calcination. Soluble zirconium in the slurry is precipitated as an oxysulfate. In addition, the original insoluble content of the slurry, i.e., $ZrO_2$ and carbon, is retained with the precipitate. The zirconium oxysulfate which precipitates out represents about 65 to 85 percent of the zirconium values present in the starting salt melt purge. An overall recovery of zirconium values in the purge of over 98 percent is achieved. The precipitate is recovered, preferably by filtration, leaving a filtrate which generally consists of potassium chloride, sodium chloride, ferrous chloride, ferric chloride, ammonium chloride, and aluminum chloride, and which may be discarded.

In accordance with one method of operating the process of this invention, zirconium tetrachloride is vaporized from a salt melt at about 350° to 450° C. The salt melt composition can range from about 60 to 85 weight percent of zirconium tetrachloride, about 7 to 15 weight percent of alkali metal chlorides, and about 0 to 25 weight percent of water-insoluble material; the composition is maintained within this range by the continuous addition of crude zirconium tetrachloride, potassium chloride, and sodium chloride in a separate melter zone. The salt melt is continuously recirculated between the vaporizer and the melter zones. Water-insoluble components build up in the salt melt as the result of the entrainment of $ZrO_2$ and carbon in the crude tetrachloride feed, the degree of entrainment of these insoluble components affecting the rate of increase of the level of insolubles in the melt and, consequently, the amount of purge which must be withdrawn from the system in order to retain a fixed level. It is preferred that the level of water-insoluble material not exceed 25 weight percent of the melt analysis, and purging of the melt is adjusted to maintain the amount of insolubles below this value.

In addition, the melter-vaporizer system is a flow system, making the fluidity of the melt transferred from the melter to the vaporizer and from the vaporizer to the melter an important factor. If the viscosity of the salt melt returning from the vaporizer to the melter exceeds 4000 centipoises at the operating temperature, i.e., about 350° to 450° C., plugging occurs and maintenance of continuous operation is difficult. Thus, in order to maintain the fluidity of the salt melt, the system must be purged.

The purge is removed from the melter-vaporizer system as required. It may be cooled and used directly or stored, for example, in drums where it solidifies. The purge material is crushed and subsequently treated with water at about 10° to 30° C. to dissolve the soluble zirconium values and to maintain the water-insoluble components of the salt purge in suspension. The quantity of the salt purge and the water added thereto are adjusted so that the resultant slurry contains between about 0.3 and 0.7 pound of soluble zirconium per gallon of water. Sulfuric acid of about 67 to 98 percent concentration is then added in an amount sufficient to bring the soluble zirconium to sulfate ion ratio to about 2:1 to about 2.8:1. The acidified slurry is then contacted with sufficient hot water to reduce the soluble zirconium content to about 0.1 to 0.2 pound per gallon of water. The temperature is held at about 85° to 95° C., for example by steam sparging. Ammonia (28% aqueous) is added continuously to maintain the pH at about 1.4 to 1.6, and preferably at 1.5. The resultant slurry, consisting of precipitated zirconium oxysulfate and the original insoluble $ZrO_2$ and carbon, is then filtered, the filter cake containing all of the insoluble content at least 98 percent of the total zirconium content of the original salt melt purge. The filtrate, containing sodium chloride, potassium chloride, ammonium chloride, aluminum chloride, and most of the iron chlorides may be discarded.

The filter cake is then washed with hot water (about 90° C.) and metathesized with additional ammonia to convert the zirconium oxysulfate to zirconium hydroxide which is then calcined to form zirconium oxide. During the calcination, the entrained carbon content of the cake is burned off. The zirconium oxide may then be converted by standard chlorination procedure to a tetrachloride which is suitable for use as feed for the salt melt purification system.

The invention will be more fully understood by reference to the following illustrative example.

*Example*

A solid salt melt purge comprising 68.37 percent of zirconium tetrachloride, 16.90 percent of water insolubles, 9.29 percent of potassium chloride, 2.91 percent of sodium chloride, 0.79 percent of ferric chloride, 0.21 percent of ferrous chloride, and 1.53 percent of aluminum chloride was crushed into chunks generally no larger than about 15″ on a side. Five hundred pounds of this crushed material was added to about 500 gallons of water. Steam sparge and then agitators were turned on, and an additional 400 gallons of hot water (95° C.) was added to bring the soluble zirconium concentration to 0.15 pound of zirconium/gallon of water. Then 4.7 gallons of 92.5% sulfuric acid was added while maintaining the temperature of the solution at 95° C. To this acid solution was added 40 gallons of 28% aqueous ammonia, the pH of the filtrate was checked, and three additional gallons of ammonia was added slowly to maintain the pH of the solution at 1.5. The solution was digested at 95° C. for one-half hour. About 250 pounds of zirconium oxysulfate, equivalent to about 98 percent of the soluble zirconium metal in the original salt melt purge, precipitated out of solution. The precipitate also contained 63 pounds of $ZrO_2$ and 21 pounds of carbon derived from the slurry insolubles. The precipitate was separated by filtration and washed with 250 gallons of water at 90° C. The filtrate, which contained sodium chloride, potassium chloride, ammonium chloride, aluminum chloride, and iron chlorides, was discarded. The filter cake was treated with ammonia to convert the zirconium oxysulfate to zirconium hydroxide. The hydroxide was then calcined to form zirconium oxide, at which time the entrained carbon content of the cake was burned off. The resultant zirconium oxide contained about 99.5+ percent $ZrO_2$, 1500 p.p.m. iron, and 260 p.p.m. aluminum.

The above data show that by practicing the process of this invention it is possible to increase the amount of zirconium values recovered from the salt bath purification system. This invention also improves the operation of the salt bath purification system by preventing the buildup of impurities and by increasing the recovery of desirable zirconium values.

While certain specific embodiments of this invention are shown above, it will be understood that the invention is obviously subject to variations and modifications within the scope of the foregoing description of the invention and the following claims, without departing from its broader aspects.

What is claimed is:

1. A process for recovering zirconium values from a purge obtained in a salt bath purification system for zirconium tetrachloride and containing zirconium values which comprises the steps of (1) treating said purge with an excess of water at about 10° to about 30° C. to form a slurry; (2) treating the slurry resulting from step (1) with sulfuric acid at about 10° to 30° C. to convert the zirconium values to zirconium oxysulfate, the ratio of zirconium to sulfate ion being about 2:1 to about 2.8:1, (3) treating the acid solution with a base at about 85° to 95° C. to obtain a pH of about 1.4 to 1.6 and precipitate the zirconium oxysulfate; and (4) recovering said zirconium oxysulfate.

2. The process of claim 1 wherein the purge contains about 60 to about 85 weight percent of zirconium halide.

3. The process of claim 1 wherein water is used in step (1) in an amount sufficient to form a slurry containing about 0.3 to 0.7 pound of zirconium per gallon of water.

4. The process of claim 1 wherein the ratio of zirconium to sulfate ion in step (2) is about 2.5:1.

5. The process of claim 1 wherein the base is ammonia.

References Cited in the file of this patent

UNITED STATES PATENTS

| 1,540,425 | Ryan | June 2, 1925 |
| 2,294,431 | Wainer | Sept. 1, 1942 |